June 27, 1967          J. J. CARLIN          3,327,355

MULTI-PLATE TRANSFER MOLD

Filed June 22, 1965

INVENTOR.
JOHN J. CARLIN

BY

ATTORNEY

United States Patent Office 3,327,355
Patented June 27, 1967

3,327,355
MULTI-PLATE TRANSFER MOLD
John J. Carlin, Bay Village, Ohio, assignor to Clevite Corporation, a corporation of Ohio
Filed June 22, 1965, Ser. No. 465,948
5 Claims. (Cl. 18—42)

This invention relates generally to a molding apparatus for molding rubberlike material and more particularly to a multi-plate transfer mold in which the component plates are pneumatically separable.

The mold herein under consideration is generally referred to as a transfer mold and is conventionally composed of a top plunger plate, a plate for transferring the rubberlike material to a third plate which has mold cavities and a fourth plate which constitutes the bottom plate. Molds of this type are well known in the art and are structurally, as well as from an operating point of view, distinguishable from compression molds which employ merely a mold cavity plate and a top and bottom plate.

In the past, substantial difficulty has been experienced in separating the various plates from each other. The rubber material retained between the plates has a tendency to adhere to the plates and make such separation more difficult. It has therefore been necessary to employ various devices to force the plates apart. The most elementary and crudest approach has been to utilize a pry-bar which is forcibly inserted between the plates. In a more sophisticated approach it has been suggested to mount one end of a hydraulic or pneumatic cylinder to a stationary object and to secure the opposite end to one of the plates for pulling or pushing the plates apart. In a still other approach a series of compression springs have been employed which are arranged around the periphery of the mold to force the plates apart.

The devices and methods used in the prior art have numerous shortcomings in that they basically do not lend themselves to a high efficiency mass production type of operation. Various manipulations are ordinarily required by the operator. For instance, it is common practice to remove the molding apparatus from the press to give the operator sufficient space in which to manipulate and separate the plates. This requirement makes it frequently necessary to disconnect the hydraulic or pneumatic system between the plate and the press to which the hydraulic cylinder is usually attached.

It is therefore the primary object of this invention to provide a mold facilitating a more efficient handling of the molding process.

It is a more specific object of this invention to provide a multi-plate mold in which the separation of the plates is accomplished by pneumatic means.

It is a still further object of this invention to provide a multi-plate mold of the type above referred to, in which the pneumatic means for separating the plates is an integral part of the mold apparatus.

An aspect of the present invention resides in the provision of a multi-plate mold for rubberlike material. The mold comprises a plurality of rigid mold plates which are disposed in cooperating relationship. The apparatus includes a first and a second plate which define a cavity therebetween for receiving the rubberlike substance which is to be molded. The second plate faces the first plate and during the molding operation is rigidly secured thereto. The first plate is provided with a conduit to establish fluid communication between the surface facing the cavity and an external area. An air inlet fitting is disposed in the conduit proximate to the external area and connectible to a source of air under pressure and a check valve, or the like, is arranged in the conduit proximate to the aforementioned cavity.

For a better understanding of the present invention, together with other and further objects thereof, reference is had to the following description taken in connection with the accompanying drawings, and its scope will be pointed out in the appended claims.

Figure 1:
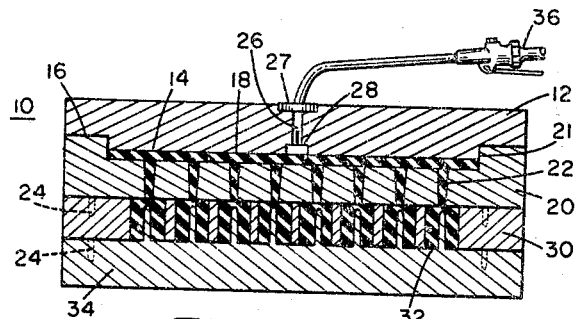
FIGURE 1 is a cross sectional view of a typical multi-plate mold shown with rubberlike material in certain cavities thereof.

Referring now to the drawings there is shown in FIG. 1 a multi-plate mold 10 which comprises a plunger plate 12, a transfer plate 20, an insert plate 30 and a bottom plate 34. The plunger plate is formed with a pistonlike protuberance 14 extending into cylinder portion 21 of transfer plate 20 and shoulder portions 16 which are adapted to rest the plunger plate upon corresponding shoulder structures of the transfer plate. A cavity 18 is provided between plates 12 and 20 and the raw material is placed at the beginning of the molding operation into this cavity. The piston 14 bears heavily against the raw material. It is understood of course that the piston is actuated by a conventional molding press, or the like, which is not shown and does not form a part of this invention.

The transfer plate 20 is provided with a plurality of transfer cavities 22 or sprue. The raw material for the process of the type herein under consideration is rubber, or rubberlike material such as plastics, and upon heating this material under adequate pressure, by means not shown, the material is caused to flow through the transfer cavities 22 into suitably formed mold cavities 32. To maintain the plates in a secure and rigid cooperating relationship the plates are provided with dowel pins 24 which protrude into suitably arranged apertures.

The bottom plate 34 forms an enclosure for the lower portion of the apertures of the mold cavities 32. It will be appreciated that upon separation of plates 20 and 34 relative to the insert plate 30 the final product within the mold cavities 32 can be pushed out from either direction.

To facilitate the separation of the plunger plate 12 and the transfer plate 20, the plate 12 is provided with a conduit 26 which extends vertically through the plate. At the upper end of the conduit 26 there is inserted an air inlet fitting 27 and at the opposite end, facing the cavity 18, a cylinder head check valve 28 is suitably mounted in the path of the conduit.

During operation of the device a relatively high percentage of rubber particles are retained within the cavity 18 and the crevices and other openings are caused to be filled by this material. As a result, the cavity 18 becomes an airtight chamber. When air pressure in introduced by suitable means 36 through the air inlet fitting 27, conduit 26 and check valve 28, the valve is actuated and the space in cavity 18 is filled with air under pressure. The piston 14 of plunger plate 12 in conjunction with the cylinder 21 of the transfer plate acts as a pneumatic cylinder and forces the plates apart. This movement takes place, from an operating point of view, at the very instant the air is forced through the conduit.

The check valve 28 prevents the rubber, in fluid or semi-fluid form, from penetrating into the conduit 26 to avoid blockage of the passageway.

Figure 2:
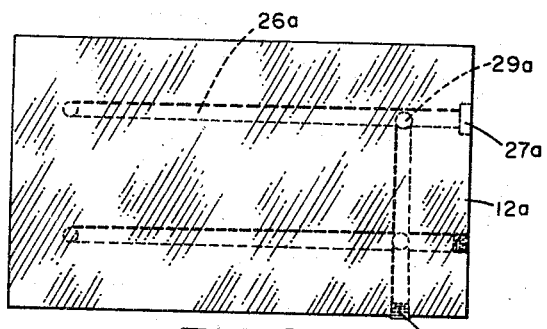
FIGURE 2 is a plan view of a modified multi-plate mold in accordance with this invention.

Referring now to FIGURE 2, the above described invention is illustrated with more than one pneumatic conduit leading to the cavity 18 between plates 12 and 20.

More particularly there is shown that plunger plate 12a is of a rectangular configuration and is provided with one access opening 27a which is connectible to a source of high pressure air. A conduit 26a extends from the opening and leads to four fluid outlets 29a which terminate at and are located proximate to the cavity 18. The conduits 26a are suitably sized to establish equal fluid pressure at each outlet. A check valve, not shown, is provided near each outlet opening. To provide the necessary conduits, opening are drilled and end portions thereof are subsequently plugged, e.g., see 38. This facilitates the fabrication of the mold inasmuch as only a single access opening is desired in most instances.

Figure 3:
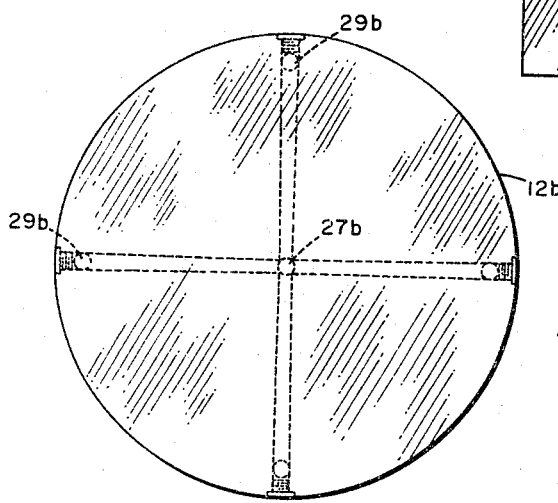
FIGURE 3 is a view similar to FIGURE 2 showing a further modification of the mold.

FIGURE 3 is a further modification of the invention shown in FIGURE 2. The difference being mainly that the plunger plate 12b is of circular configuration and that there are provided five outlet openings 29b with a single, centrally located, access opening 27b.

Figure 4:
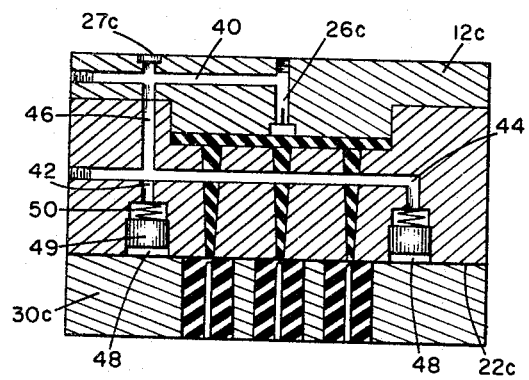
FIGURES 4 and 5 are views similar to FIGURE 1 showing in enlarged, partly schematic form the two upper plates embodying further modifications of this invention.

FIGURE 4 shows a still further modification of the basic invention. The plunger plate 12c is provided with a centrally located conduit 26c. In this embodiment access opening 27c supplies fluids not only to conduit 26c by way of branch 40 but is also connected to fluid passageways 42 and 44 located within the transfer plate 22c by way of branch conduit 46. The ends of certain branch lines, as shown, are blocked off for reasons above referred to. The branch lines 42 and 44 connect the access opening to cylinder chambers 48 which are arranged in the lower portion of the transfer plate 22c and thus face the insert plate 30c. Disposed within each cylinder chamber 48 is a piston 49 which is supended on a spring 50 for bias in an upward direction and movable within the chamber for engagement with the insert plate 30c in response to air pressure acting upon its upper face. The introduction of air pressure through the access openings 27c, conduits 46 and one of the branch lines, e.g., 42, into the cylinder chamber 48 causes the piston 49 to be axially displaced until the piston pushes against the insert plate and causes the latter plate to be displaced relative to the transfer plate. The springs 50 are effective to retract the piston 49 once the air pressure has been released.

Figure 5:
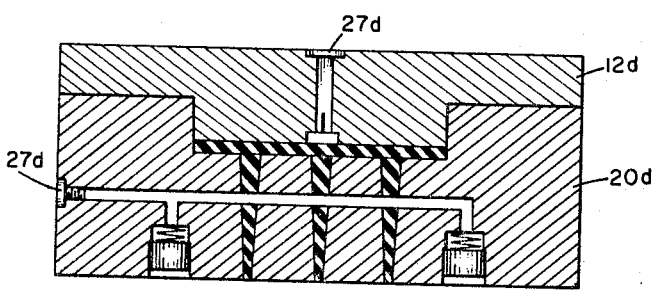

The embodiment of FIGURE 5 is very similar to FIGURE 4, except that herein separate air inlet openings 27d and 27e are provided and the pneumatic plate separating arrangement embodied in the plunger plate 12d is completely independent of the pneumatic separating system provided for in transfer plate 20d. In all other respects the construction and operation is identical to the one aforedescribed.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A multi-plate mold for rubberlike material comprising, in combination: a plurality of rigid mold plates disposed in cooperating relationship, including a first plate, a second plate having a cavity for receiving a rubberlike material therein, and a third plate having a mold cavity placed in molding position to said second plate, said second plate facing said first plate and being rigidly secured to said first plate during the molding operation, said first plate having a conduit extending therethrough to establish fluid communication between the surface facing said cavity and an external area; an air inlet fitting disposed in one end of said conduit proximate to the external area and connected to a source of high pressure air during operation of the mold device; and check valve means disposed in the path of said conduit proximate to the outlet thereof.

2. A multi-plate mold according to claim 1, wherein said first plate constitutes the plunger plate, and said second plate constitutes the transfer plate.

3. A multi-plate mold for rubberlike material comprising, in combination: a plurality of rigid mold plates disposed in cooperating relationship, said plates including a first and second plate defining a cavity for receiving rubber therebetween, one of said first and second plates having an access opening connected to a source of high pressure air during operation of the mold device and a conduit extending therefrom defining at the end thereof a cylinder chamber, and a third plate facing said cylinder chamber and constituting an insert plate provided with a plurality of mold cavities, and piston means operably suspended within said chamber and responsive to air pressure for engagement with said third plate.

4. A multi-plate mold for rubberlike material comprising, in combination: a plurality of rigid mold plates disposed in cooperating relationship including a plunger plate and a transfer plate defining a cavity for receiving rubber therebetween, said transfer plate having a plurality of transfer cavities arranged for receiving rubber from said first named cavity, and an insert plate provided with a plurality of mold cavities arranged in juxtaposition to said transfer cavities, an access opening in one of said plates connected to a source of high pressure air during operation of the mold device and a conduit extending therefrom and terminating into the first named cavity.

5. A multi-plate mold for rubberlike material comprising, in combination: a plurality of rigid mold plates disposed in cooperating relationship, including a plunger plate and a transfer plate defining a cavity for receiving rubber therebetween, said plunger plate having an access opening connected to a source of high pressure air during operation of the mold device and a conduit extending therefrom and terminating into said cavity, check valve means disposed in the path of said conduit proximate to the location of said cavity; said transfer plate having a plurality of transfer cavities arranged for receiving rubber from said first named cavity, and an insert plate provided with a plurality of mold cavities arranged in juxtaposition to said transfer cavities, said transfer plate having an access opening connected to a source of high pressure air during operation of the mold device and a conduit extending therefrom defining at the end thereof a cylinder chamber facing said insert plate; piston means operably suspended within said chamber and responsive to air pressure for exerting a force between said transfer and insert plates in response to actuation thereof.

References Cited

UNITED STATES PATENTS

| | | | |
|---|---|---|---|
| 2,807,564 | 9/1957 | Mitchell | 18—42 XR |
| 2,883,704 | 4/1959 | Jurgeleit | 18—42 XR |
| 2,900,663 | 8/1959 | Linhorst | 18—42 XR |
| 3,102,304 | 9/1963 | Divers. | |
| 3,145,423 | 8/1964 | Horvereid | 18—42 |
| 3,151,374 | 10/1964 | Kersten | 18—2 XR |

A. SPENCER OVERHOLSER, *Primary Examiner.*

J. HOWARD FLINT, JR., *Examiner.*